US012710221B2

(12) United States Patent
Herrero Garcia et al.

(10) Patent No.: US 12,710,221 B2
(45) Date of Patent: Aug. 18, 2026

(54) COOLING DEVICE HAVING A HINGE BOX EMBODIMENT

(71) Applicant: BSH Hausgeräte GmbH, Munich (DE)

(72) Inventors: Sergio Herrero Garcia, Langenau (DE); Toygun Karakaya, Tekirdag (TR); Prashantagouda Hosamani, Ulm (DE); Yalcin Özsoy, Heidenheim an der Brenz (DE)

(73) Assignee: BSH Hausgeräte GmbH, Munich (DE)

( * ) Notice: Subject to any disclaimer, the term of this patent is extended or adjusted under 35 U.S.C. 154(b) by 89 days.

(21) Appl. No.: 18/947,217

(22) Filed: Nov. 14, 2024

(65) Prior Publication Data

US 2025/0237099 A1 Jul. 24, 2025

(30) Foreign Application Priority Data

Jan. 18, 2024 (TR) ................................ 2024/000576

(51) Int. Cl.
*F25D 23/02* (2006.01)
*F25D 23/06* (2006.01)

(52) U.S. Cl.
CPC ......... *F25D 23/028* (2013.01); *F25D 23/062* (2013.01); *E05Y 2900/306* (2013.01); *E05Y 2900/31* (2013.01); *F25D 2323/024* (2013.01)

(58) Field of Classification Search
CPC ........... E05Y 2900/31; E05Y 2900/306; F25D 23/062; F25D 23/065; F25D 2323/024; F25D 23/028; F25D 2400/04; F25D 23/066; F25D 23/067; F25D 23/063; E05D 15/04
See application file for complete search history.

(56) References Cited

U.S. PATENT DOCUMENTS

| | | | | |
|---|---|---|---|---|
| 4,632,470 | A * | 12/1986 | Jenkins | F25D 23/062 312/138.1 |
| 6,036,293 | A * | 3/2000 | Anell | F25D 23/063 312/401 |
| 8,752,921 | B2 | 6/2014 | Görz et al. | |
| 8,864,253 | B2 * | 10/2014 | Gorz | F25D 23/064 312/406 |
| 9,702,615 | B1 * | 7/2017 | Chartrand | F25D 23/02 |
| 10,753,669 | B2 | 8/2020 | Dherde et al. | |

(Continued)

FOREIGN PATENT DOCUMENTS

EP 1957906 B1 12/2017

*Primary Examiner* — Hiwot E Tefera
(74) *Attorney, Agent, or Firm* — Laurence A. Greenberg; Werner H. Stemer; Ralph E. Locher

(57) ABSTRACT

A cooling device contains a body which has a lower wall, an upper wall, lateral walls and a rear wall. A door is connected to the body by hinges, a support frame provided at a device front side of the body which is close to the door and where the door is connected by the hinges. The support frame contains a hinge box embodiment which has mutual vertical profile elements, an upper hinge box provided at a device upper side where the upper hinge is connected, and a couple of lower hinge boxes provided at a device lower side for the lower hinge and where a lower hinge recess exists in each one in a manner for accommodating the lower hinge and provided in a distanced manner to each other in a width direction. The hinge box embodiment has a lower connection bracket for seating a lower panel.

17 Claims, 13 Drawing Sheets

(56) References Cited

U.S. PATENT DOCUMENTS

| | | | | |
|---|---|---|---|---|
| 2003/0141793 | A1* | 7/2003 | Lee | F25D 23/063 312/401 |
| 2004/0012315 | A1* | 1/2004 | Grace | F25D 23/062 312/406 |
| 2005/0194874 | A1* | 9/2005 | Jang | E05D 7/081 312/405 |
| 2017/0184341 | A1* | 6/2017 | Grimm | F25D 21/04 |
| 2018/0149407 | A1* | 5/2018 | Akalan | F25D 23/003 |
| 2019/0154328 | A1* | 5/2019 | Dherde | E05D 5/046 |
| 2021/0148628 | A1* | 5/2021 | Lottinville | F25D 23/065 |
| 2021/0172673 | A1* | 6/2021 | Guo | F25D 23/06 |
| 2021/0222944 | A1* | 7/2021 | Harikrishnasamy | F25D 23/067 |
| 2023/0148766 | A1 | 5/2023 | Park et al. | |

* cited by examiner

COOLING DEVICE HAVING A HINGE BOX EMBODIMENT

CROSS-REFERENCE TO RELATED APPLICATION

This application claims the priority, under 35 U.S.C. § 119, of Turkish Patent Application TR 2024/000576, filed Jan. 18, 2024; the prior application is herewith incorporated by reference in its entirety.

FIELD AND BACKGROUND OF THE INVENTION

The present invention relates to a cooling device having a hinge box embodiment according to the preamble of the independent cooling device claim.

In cooling devices, especially at the front sides of refrigerators or freezers, there is at least one door connected to the body of the cooling device by means of hinges, particularly by means of multi-jointed hinges. Cooling devices and therefore the doors of cooling devices can sometimes be very wide, in other words, they can be over 85 cm, and this condition can lead to the doors being very heavy because of the dimension of the doors and the required technical deviation. Moreover, there can be objects stored in big amounts at the doors, for instance there can be shelves including foods to be cooled. On the other hand, particularly in built-in cooling devices, after installation, there is a very heavy furniture plate at the door, whose weight must be supported by the door. Moreover, big loads can occur both at hinges and at the connection points of hinges at the body side in the open position of the door where the hinge makes protrusion outwardly.

European patent EP 1 957 906 B1, corresponding to U.S. Pat. No. 8,752,921, relates to a cooling device, particularly a refrigerator and/or freezer including a body which has a ceiling, a base and lateral walls, and at least one door retained by means of hinges. On the body, there is a support frame where the door is retained by means of hinges. The characteristic of the invention is that a special mechanical stability is obtained for the casing with the help of the support frame and it provides fixation of even big and heavy doors in a reliable manner and provides staying operationally safe.

The invention provides an additional improvement, an additional advantage or an alternative to the prior art.

SUMMARY OF THE INVENTION

The object of the invention is to provide a cooling device which has a hinge box embodiment which is reinforced at the body side.

The invention, to achieve the abovementioned purpose, is a cooling device, particularly a refrigerator and/or freezer having a body which has a lower wall, an upper wall, lateral walls and a rear wall, at least one door connected to the body by means of hinges, a support frame provided at a device front side of the body which is close to the door and where the door is connected by means of hinges, wherein the support frame contains a hinge box embodiment which has mutual vertical profile elements, at least one upper hinge box provided at a device upper side where the upper hinge is connected, and a couple of lower hinge boxes provided at a device lower side for the lower hinge and where a lower hinge recess is existing in each one in a manner accommodating the lower hinge and provided in a distanced manner to each other in a width direction. A hinge box embodiment contains a lower connection bracket seating to a lower panel provided at the horizontal plane in an associated manner with the lower wall and embodied such that the lower hinge boxes can be placed and connected thereon; and at least one upper connection bracket configured in a manner connecting to the lower hinge boxes from one side and connecting to each vertical profile elements from the other side. By means of this, a hinge box embodiment is provided which is reinforced against the big loads which occur at the connection points of the hinges at the body side.

Here, the "cooling device" inscription is any device, particularly a refrigerator and/or freezer which has a cooling cycle and which can realize the cooling function.

Here, by means of the "hinge box" inscription, a structure is described whereto the related hinges are connected and where the hinges can be accommodated in the hinge box in case the related door is in closed condition. The hinge box can be a structure which is essentially in box form whose one side is open.

Here, the "support frame" inscription means a body support/reinforcement structure of the cooling device, including support rods. The support frame can be provided at a front side of the cooling device body which is close to the door. In the support frame structure, there can be vertical profile element and horizontal profile elements connected to each other. The horizontal and vertical profile elements that exist at the support frame can be made of a metal material, particularly a steel material with high resistance.

Here, by means of the "vertical profile element" inscription, a profile element of the support frame is described which extends in the vertical direction.

In a possible embodiment of the invention, each of the lower hinge boxes has a hinge box lower wall provided in a manner seating to the lower connection bracket, and a hinge box upper wall provided at the opposite side with respect to the hinge box lower wall and where the related profile end parts of the vertical profile elements are rested. By means of this, the hinge box is supported from the lower side by means of the lower connection bracket, and can be connected to the vertical profile elements of the support frame from the upper side. Thanks to this structure, vertical profile elements that are in profile form can be used.

In a possible embodiment of the invention, the lower connection bracket contains at least one first connection hole through which a first connection element passes in order to be connected to the lower panel. By means of this, the lower connection bracket is connected to the lower panel in a stable manner.

Here, the lower connection bracket can comprise one or more than one first connection hole. These first connection holes can be provided at the sides of the lower connection bracket which are opposite to each other. On the other hand, also at the lower panel, there can be connection holes which correspond to the first connection holes which exist at the lower connection bracket.

Here, said "first connection element" can be any external connection element which connects the two parts to each other, for instance, a rivet, bolt or screw, preferably a screw.

In a possible embodiment of the invention, the lower connection bracket contains at least one connection flap which has at least one second connection hole through which the first connection element passes in order to be connected to the lower panel. By means of this, an improved lower connection bracket-lower panel connection is obtained.

In a possible embodiment of the invention, the lower connection bracket has a bracket rear wall provided at the opposite side of a hinge box front opening provided at the sides of the lower hinge boxes facing the hinge and embodied to be connected to a hinge box rear wall which is essentially in orthogonal direction with respect to the lower panel. By means of this, the connection of the hinge box to the lower connection bracket is provided for a reinforced hinge box embodiment.

In a possible embodiment of the invention, the upper connection bracket contains a horizontal bracket wall embodied to be connected to the hinge box upper wall, a vertical bracket wall embodied to be connected to the hinge box rear wall and which extends essentially in an orthogonal direction to the horizontal bracket wall, and mutual connection bracket parts embodied to be connected to the vertical profile elements. By means of this, the hinge box embodiment, where the lower hinges are connected, is connected to the support frame.

Here, the "connection bracket parts" inscription can mean any bracket part, for instance, a corner bracket which is in connection extension form.

In a possible embodiment of the invention, each of the connection bracket parts is essentially an L-shaped connection extension. By means of this, the hinge box embodiment, where the lower hinges are connected, is connected to the support frame.

In a possible embodiment of the invention, the connection bracket parts comprise at least one bracket connection hole through which a connection element passes in order to be connected to a profile rear wall of the vertical profile elements which faces the body. By means of this, the hinge box embodiment, where the lower hinges are connected, is connected to the support frame.

Here, the "connection element" inscription can be any external connection element which connects the two parts to each other, for instance, a rivet, bolt or screw, preferably a rivet.

In a possible embodiment of the invention, the connection bracket parts contain a resting wall in a manner resting to a profile lateral wall which is essentially in an orthogonal direction to the profile rear wall of the vertical profile elements. By means of this, during the connection process, alignment of the vertical profile elements in accordance with the connection bracket parts is facilitated.

In a possible embodiment of the invention, the upper connection bracket contains at least one opening provided in a manner opening to an intermediate space which exists between the lower hinge boxes. By means of this, the isolation material which exists in the body of the cooling device passes to the intermediate space which exists between the lower hinge boxes. The isolation material can be any isolation material, preferably polyurethane material in a manner providing isolation between the inner part of the cooling device and the outer medium.

In a possible embodiment of the invention, the lower connection bracket contains at least one base embossment which is in elevation form such that the lower wall of the related hinge box is seating and embodied to provide a related first seating surface for the lower hinge boxes. By means of this, a seating surface is provided such that the hinge box lower wall shall be seated.

Here, the "base embossment" inscription means an elevation form such that the lower connection bracket diverges from the lower panel.

In a possible embodiment of the invention, the lower connection bracket contains a base depression embodied to provide a second seating surface in order to seat to the lower panel. By means of this, the lower connection bracket is seated to the lower panel.

Here, the "base depression" inscription means a depression form such that the lower connection bracket approaches to the lower panel.

In a possible embodiment of the invention, each hinge box rear wall contains at least one hinge connection opening provided for connecting the lower hinge. By means of this, the connection of the lower hinge with the related lower hinge box is provided. This connection can be by means of a connection element which passes through the related corresponding connection holes that exist on the hinge connection opening and on the lower hinge. The connection element can be an external connection element like a screw or a bolt.

In a possible embodiment of the invention, the support frame contains an upper profile element which connects the vertical profile elements to each other at a side which is opposite to the side where the hinge box embodiment is existing and where the upper hinge box is connected and which essentially extends horizontally. By means of this, the upper part of the support frame is reinforced for the upper hinge.

Here, the "upper profile element" can be a horizontal profile element which extends between the corresponding vertical profile elements in the horizontal direction and which binds the vertical profile elements to each other.

In a possible embodiment of the invention, the lower hinge boxes, the lower connection bracket and the upper connection bracket are made of a metal material, particularly a steel material. By means of this, a highly resistant material is used against the big loads which occur at the connection points of hinges which exist at the body side.

In this context, with the indications "ceiling", "bottom", "upper", "lower", "front", "rear", "horizontal", "vertical", "upwards", "downwards", "inner", "outer", "inwardly", "outwardly" etc. the positions and orientations given for intended use and intended arrangement of the cooling device and for a user then standing in front of the cooling device in a closed position of the door and viewing in the direction of the cooling device are indicated.

Each possible embodiment disclosed in this text can be combined with the other possible embodiments disclosed in this text if there is no any technical constraint.

Other features which are considered as characteristic for the invention are set forth in the appended claims.

Although the invention is illustrated and described herein as embodied in a cooling device having a hinge box embodiment, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
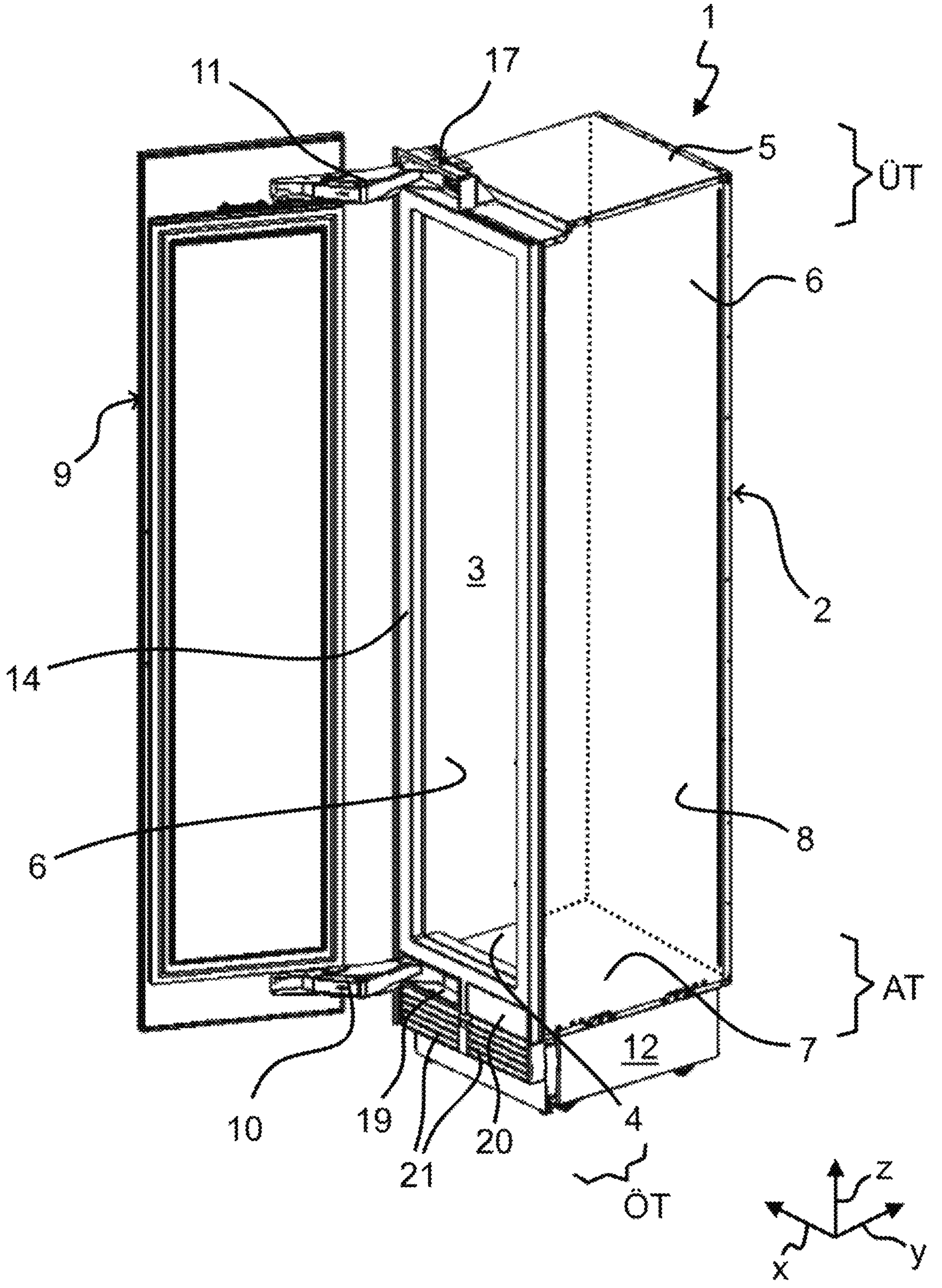
FIG. 1 is an isometric view of a cooling device containing a subject matter hinge box embodiment.

In this detailed explanation, the invented subject matter is explained with examples in order to make the subject more understandable without forming any restrictive effect.

Within this context, a "width direction x" describes a width direction of a cooling device 1, a body 2, a hinge box embodiment 18, a support frame 56, a lower panel 13, lower hinge boxes 19, 20, an upper connection bracket 39 and a lower connection bracket 23.

Within this context, a "depth direction y." describes a depth direction of the cooling device 1, the body 2, the hinge box embodiment 18, the support frame 56, the lower panel 13, the lower hinge boxes 19, 20, the upper connection bracket 39 and the lower connection bracket 23.

Within this context, a "height direction z" describes a height direction of the cooling device 1, the body 2, the hinge box embodiment 18, the support frame 56, the lower panel 13, the lower hinge boxes 19, 20, the upper connection bracket 39 and the lower connection bracket 23.

With reference to FIG. 1, the cooling device 1 contains a body 2 having a lower wall 7, an upper wall 5, lateral walls 6 and a rear wall 8. The body 2 is provided in a manner encircling at least one compartment wherein the objects to be cooled can be placed. The compartment is a storage compartment 3. There is a front opening 4, which provides accessing to the storage compartment 3 from outside, at a device front side ÖT of the cooling device 1. The front opening 4 is provided at an opposite side of the rear wall 8. The cooling device 1 moreover contain at least one door 9 connected in a rotatable manner to the body 2 by means of hinges 10, 11. At a closed position where the door 9 is closed, the front opening 4 is completely covered and access to the storage compartment 3 from outside is prevented. As seen in FIG. 1, at an open position where the door 9 is at least partially open, external access can be provided to the storage compartment 3 through the front opening 4. There is a front frame 14 at the device front side ÖT which is close to the door 9. At a condition where the door 9 is closed, the front frame 14 has a front surface which faces the door 9. As shall be seen in FIG. 1, there is a machine compartment 12 at a device lower side AT which is close to the floor where the cooling device 1 sits. Components of the cooling cycle like compressor, condenser are positioned in the machine compartment 12. The front side of the machine compartment 12 is covered by front caps 21, and the components that exist in the machine compartment 12 are prevented from being seen from outside. The door 9 is rotatably connected to the body 2 by means of a lower hinge 10 at the lower side AT of the device, and by means of an upper hinge 11 at the upper side ÜT of a device which is far from the floor where the device seats.

Figure 2:
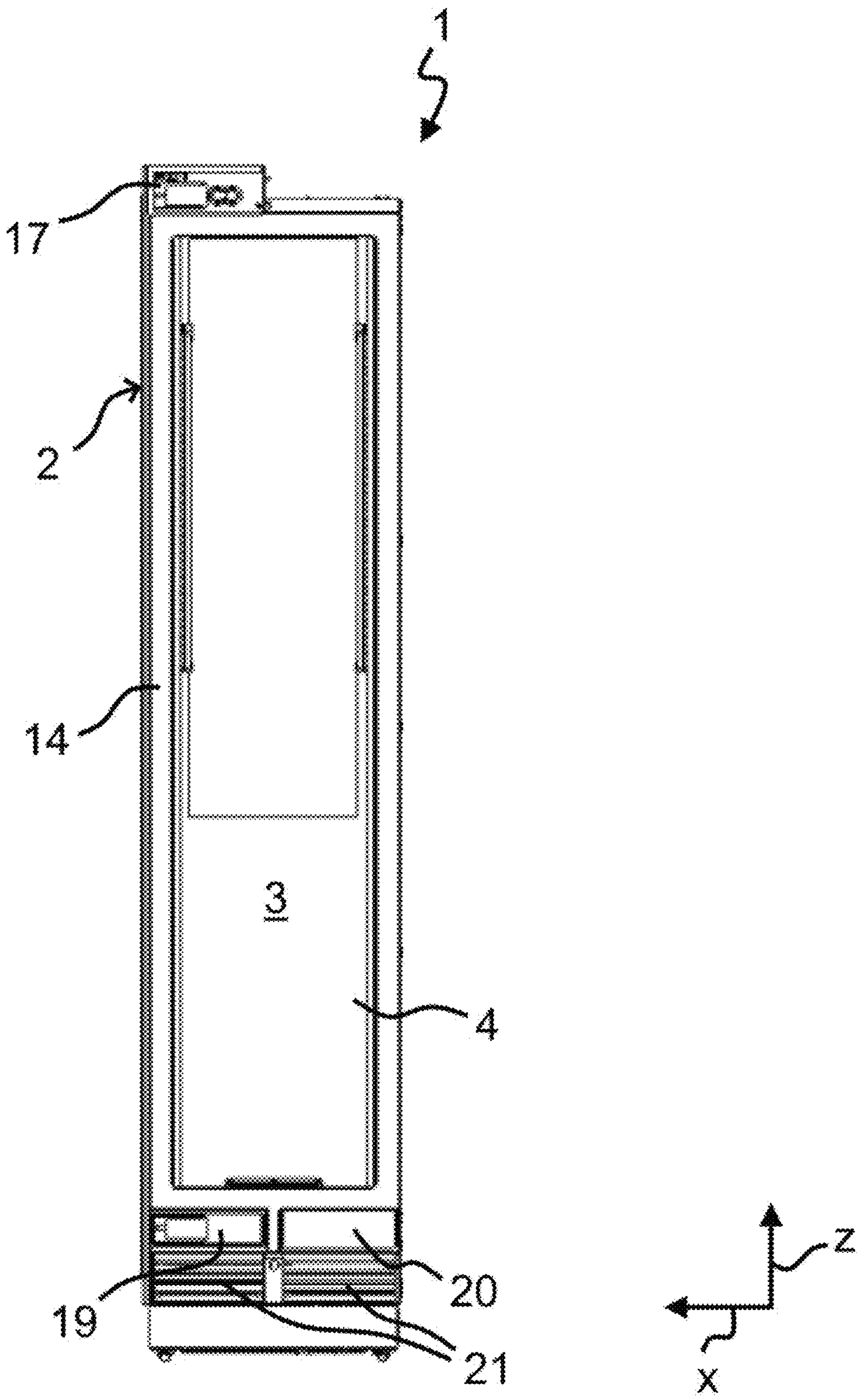
FIG. 2 is a frontal view of the cooling device containing the subject matter hinge box embodiment.

With reference to FIG. 2, there is at least one upper hinge box 17 provided at the device upper side ÜT where the upper hinge 11 is connected. The upper hinge box 17 is embodied in a manner accommodating the upper hinge 11. For the lower hinge 10, there is a hinge box embodiment 18 which has a couple of lower hinge boxes 19, 20 provided at the lower side AT of the device and embodied to be able to accommodate the lower hinge 10. The lower hinge 10 is connected to the first lower hinge box 19 which exists at the left side or to the second lower hinge box 20 which exists at the right side in accordance with the direction of the door 9. If we explain in more details, the lower hinge 10 is connected to the first lower hinge box 19 at the door 9 opened towards the left side as in FIG. 1, and the lower hinge 10 is connected to the second lower hinge box 20 at the door 9 opened towards the right side.

Figure 3:
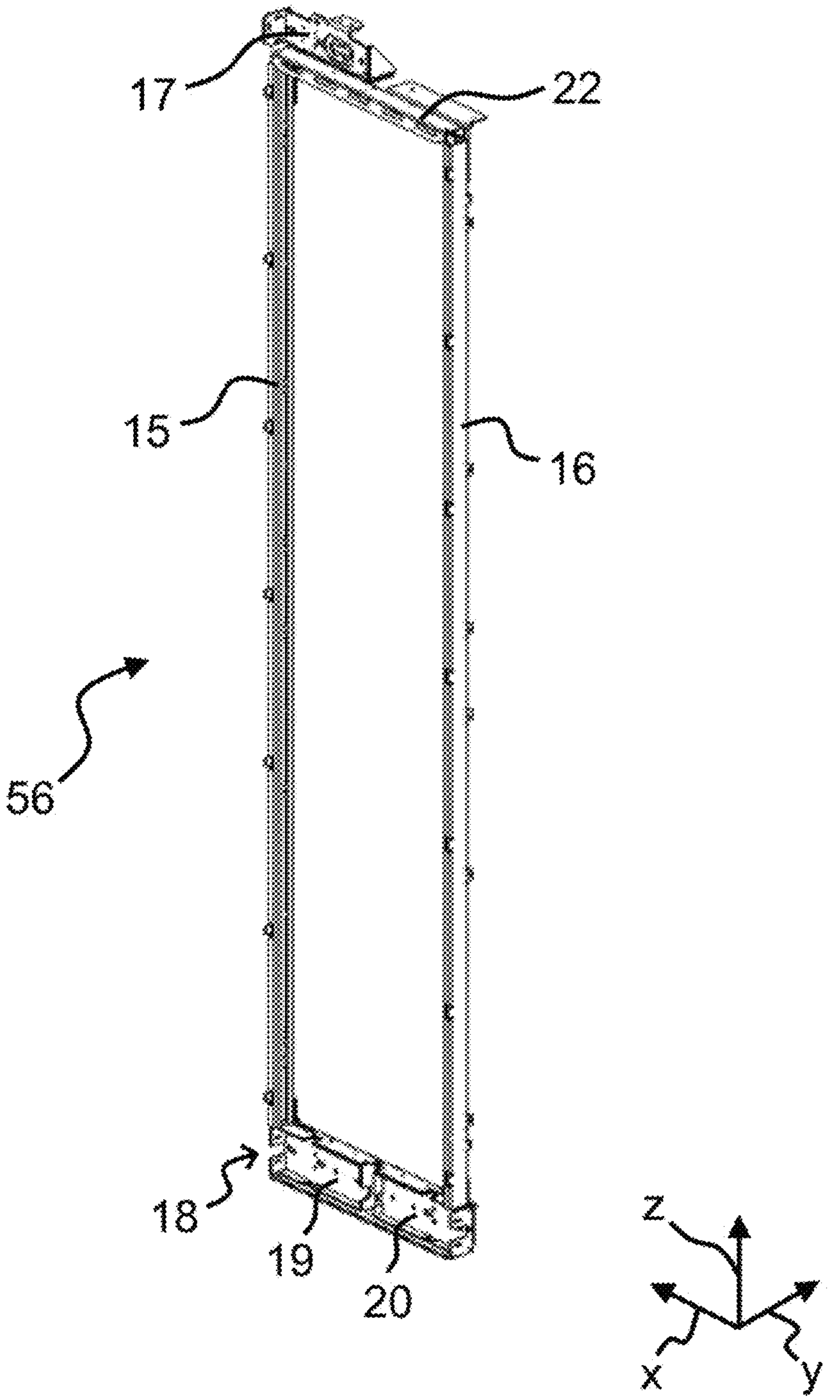
FIG. 3 is an isometric view of a support frame containing the subject matter hinge box embodiment.

With reference to FIG. 3, there is a support frame 56 provided at the device front side ÖT of the body 2 which is close to the door 9 and where the door 9 is connected by means of hinges 10, 11. The support frame 56 is provided behind the front frame 14. The support frame 56 contain mutual vertical profile elements 15, 16, namely, the first vertical profile element 15 and the second vertical profile element 16. The vertical profile elements 15, 16 essentially extend in a parallel manner to each other, essentially in the height direction z. There is the hinge box embodiment 18 at a lower side of the support frame 56 which is close to the floor. At an upper side of the support frame 56 which is opposite to the lower side where the hinge box embodiment 18 that has the lower hinge boxes 19, 20 is existing, there is an upper profile element 22 which connects the vertical profile elements 15, 16 to each other and whereon the upper hinge box 17 is connected and which essentially extends horizontally. There can be more than one upper hinge box 17 connected to the upper profile element 22. The upper profile element 22 extends essentially in a width direction x of the support frame 56.

Figure 5:
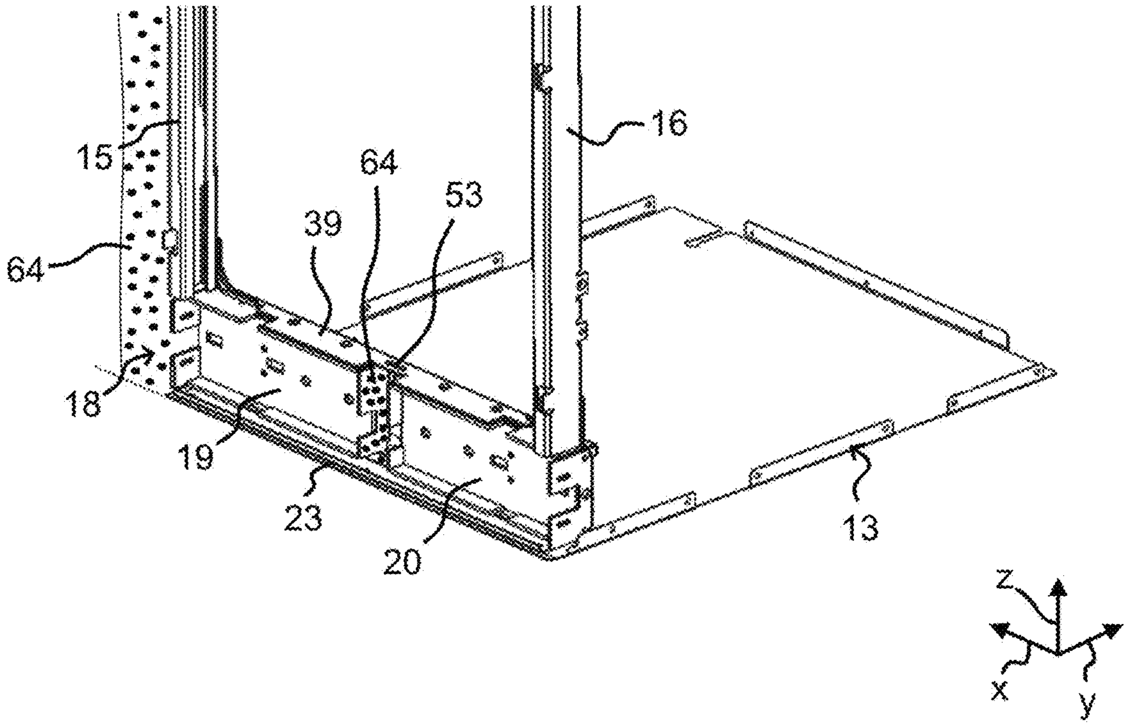
FIG. 5 is a zoomed isometric view of the part of the support frame, which contains the subject matter hinge box embodiment, where the hinge box embodiment exists, together with a lower panel.
Figure 13:
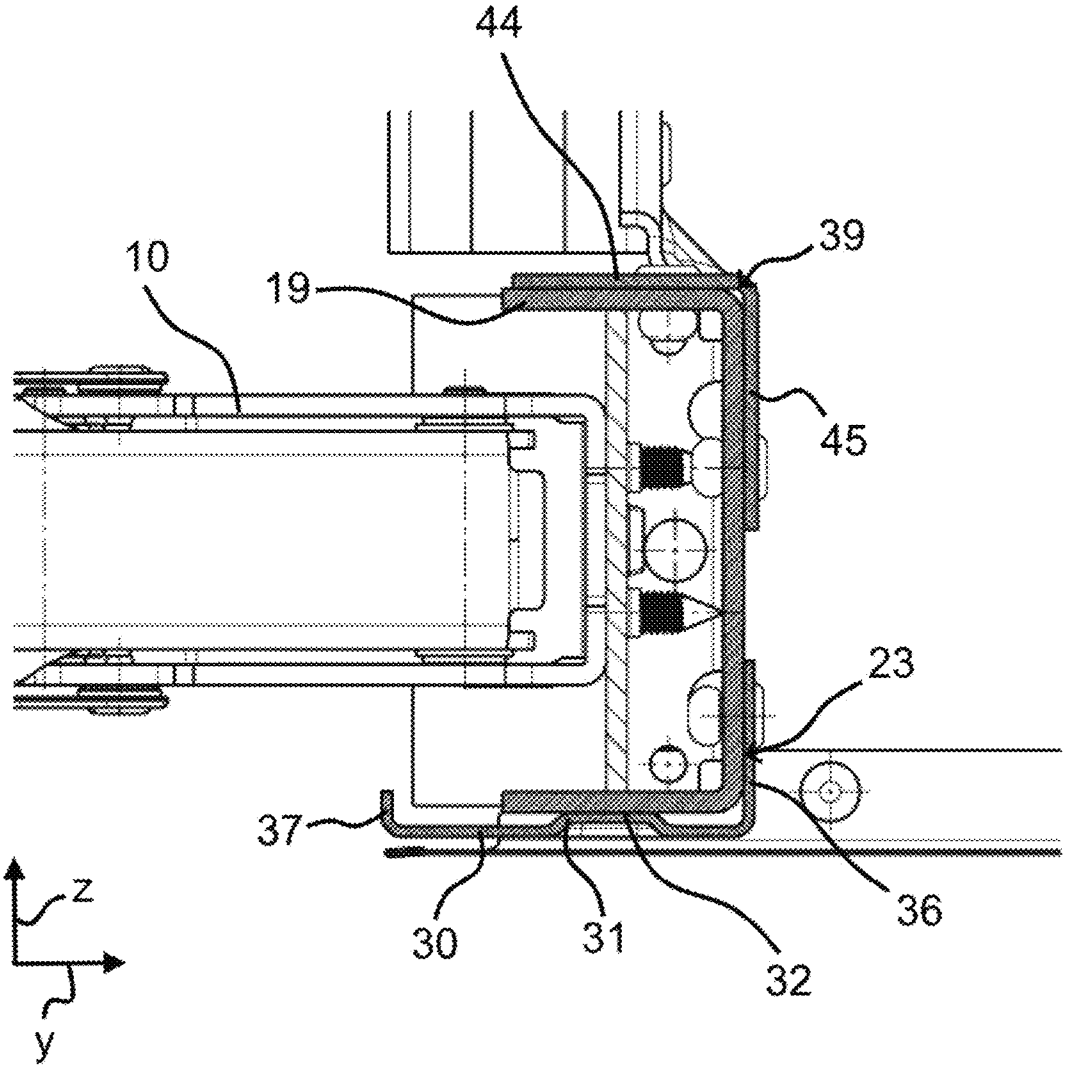
FIG. 13 is a cross-sectional view of the lower hinge and the hinge box embodiment where the lower hinge is connected, in a manner showing the base embossment part whereon the hinge box is seated.

With reference to FIG. 5, the subject matter hinge box embodiment 18 contains a lower connection bracket 23 which seats to a lower panel 13 provided at the horizontal plane in a manner associated with the lower wall 7 and embodied such that the lower hinge boxes 19, 20 are placed and connected thereon. With reference to FIG. 13, the lower connection bracket 23 contains at least one base embossment 31 which is in elevation form such that the related hinge box lower wall 51 seats and embodied to provide a related first seating surface 32 for the lower hinge boxes 19, 20. The base embossment 31 is provided on a base part 30 of the lower connection bracket 23. As shall be seen in FIG. 6, there is one each base embossments 31 for each lower hinge box 19, 20 on preferably the lower connection bracket 23. On the other hand, the hinge box embodiment 18 also contains at least one upper connection bracket 39 configured to be connected to the lower hinge boxes 19, 20 from one side and to each vertical profile elements 15, 16 from the other side FIG. 5. In the invention, the lower hinge boxes 19, 20, the lower connection bracket 23 and the upper connection bracket 39 are made of a metal material, particularly a steel material.

Figure 4:
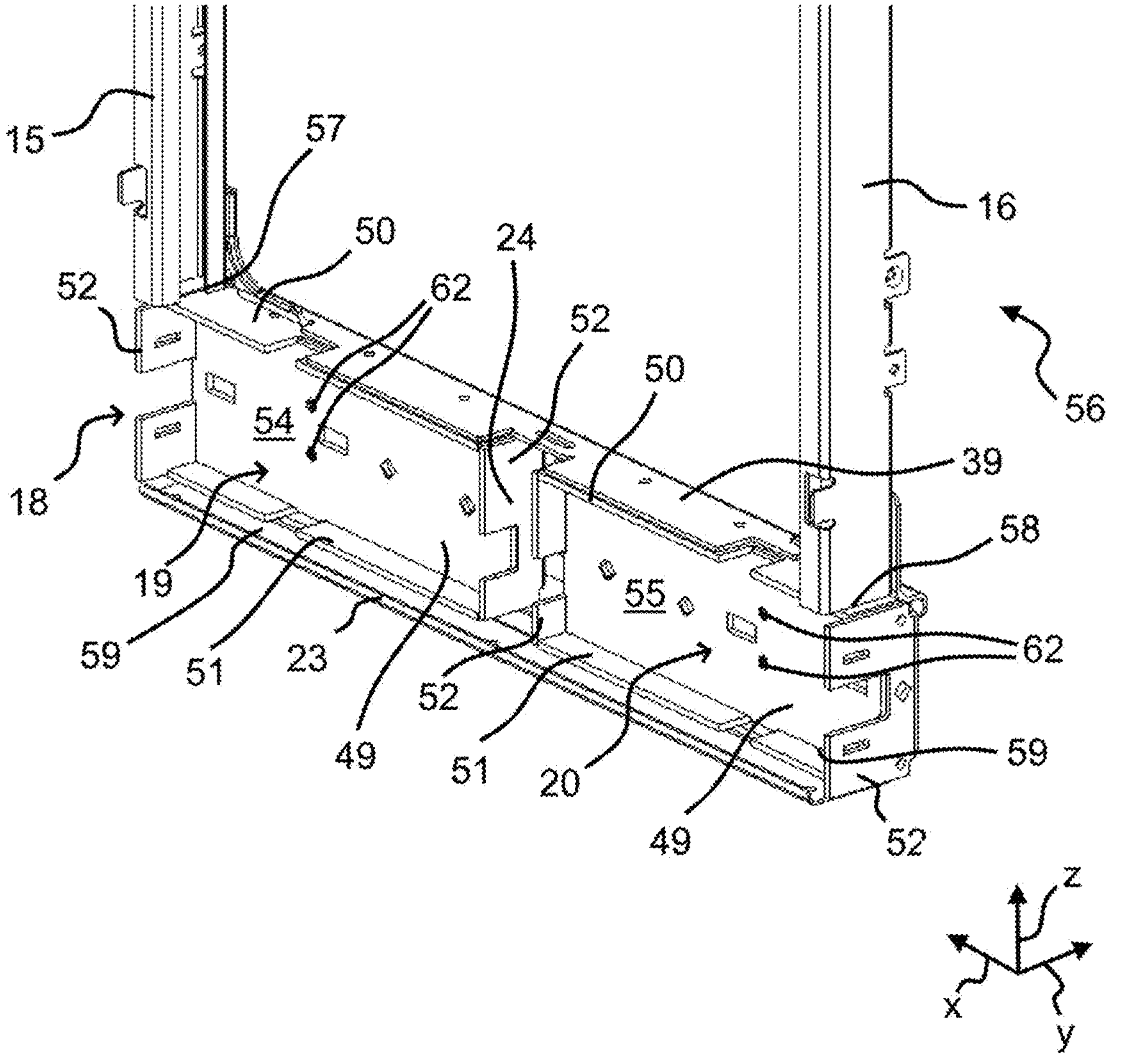
FIG. 4 is a zoomed in isometric view of a part of the support frame, which contains the subject matter hinge box embodiment, where the hinge box embodiment exists.

As shall be seen in FIG. 4, there is a lower hinge recess 54, 55 at each of the lower hinge boxes 19, 20. In other words, there is a first lower hinge recess 54 at the first lower hinge box 19 and there is a second lower hinge recess 55 at the second lower hinge box 20. The lower hinge boxes 19, 20 are configured to be provided in a distanced manner in a width direction x with respect to each other. In more details, there is an intermediate space 24 between the lower hinge boxes 19, 20. The hinge box lower wall 51 essentially extends in a parallel direction to the lower panel 13. Each of the lower hinge boxes 19, 20 has a hinge box lower wall 51 provided in a manner seating to the lower connection bracket 23. Each of the lower hinge boxes 19, 20 moreover has a hinge box upper wall 50 provided at the opposite side with respect to the hinge box lower wall 51 and where the related profile end parts 57, 58 of the vertical profile elements 15, 16 are rested. In other words, the first profile end part 57 is rested to the hinge box upper wall 50 of the first lower hinge box 19, and the second profile end part 58 is rested to the hinge box upper wall 50 of the second lower hinge box 20. Each lower hinge box 19, 20 moreover has a hinge box rear wall 49. At each hinge box rear wall 49, there is at least one hinge connection opening 62 provided for connecting the lower hinge 10 to the related lower hinge box 19, 20. In accordance with the opening direction of the door 9, the lower hinge 10 is connected to the hinge box rear wall 49 of the first lower hinge box 19 or to the hinge box rear wall 49 of the second lower hinge box 20 by means of a connection element not shown in the drawings. Each lower hinge box 19, 20 moreover has hinge box lateral walls 52 which are mutual to each other. Thus, the first lower hinge recess 54 and the second lower hinge recess 55 are defined for each of the lower hinge boxes 19, 20. As seen in FIG. 4, the lower connection bracket 23 is provided at a lower side of the hinge box embodiment 18, and the upper connection bracket 39 is provided at an upper side of the hinge box embodiment 18 which is opposite to the lower side.

Figure 6:
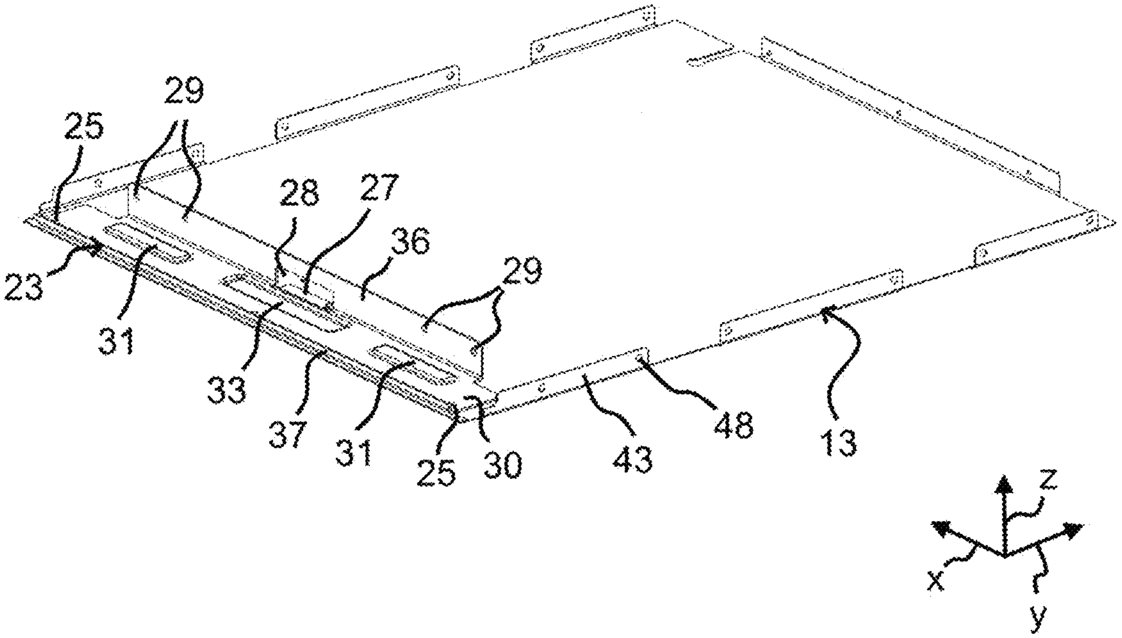
FIG. 6 shows an isometric view related to a lower connection bracket which seats on the lower panel.
Figure 9:
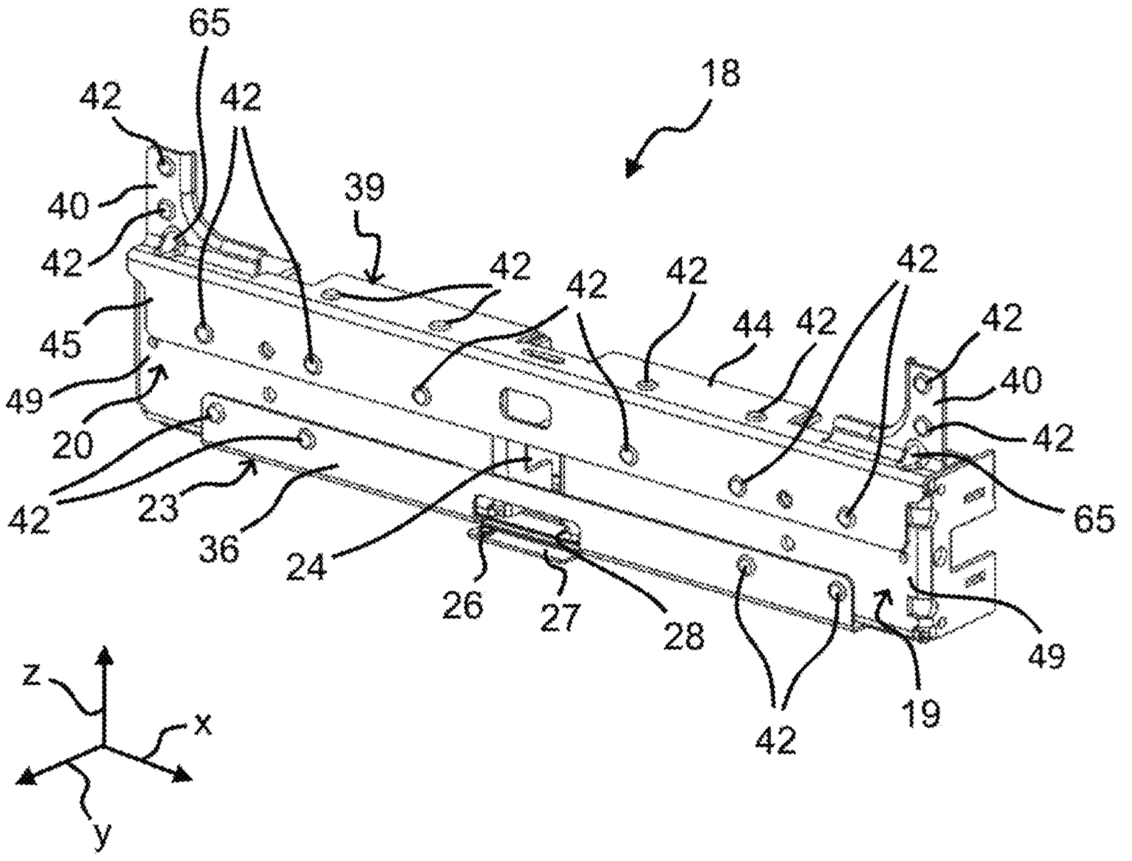
FIG. 9 is an isometric view of the subject matter hinge box embodiment.
Figure 10:
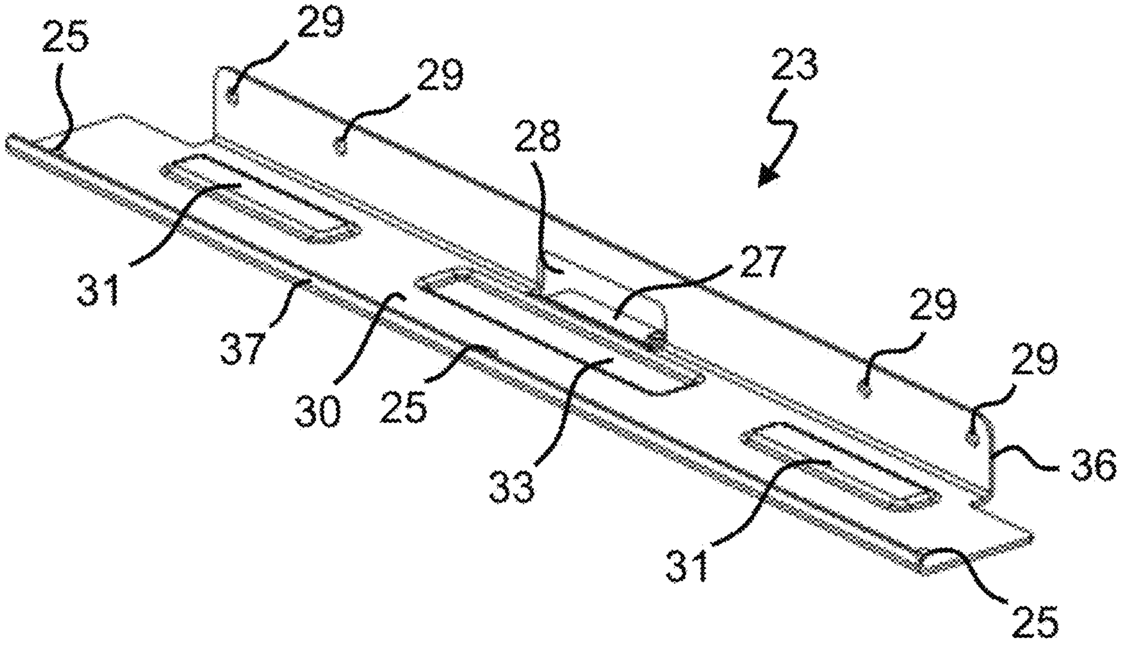
FIG. 10 is an isometric view of the lower connection bracket.
Figure 11:
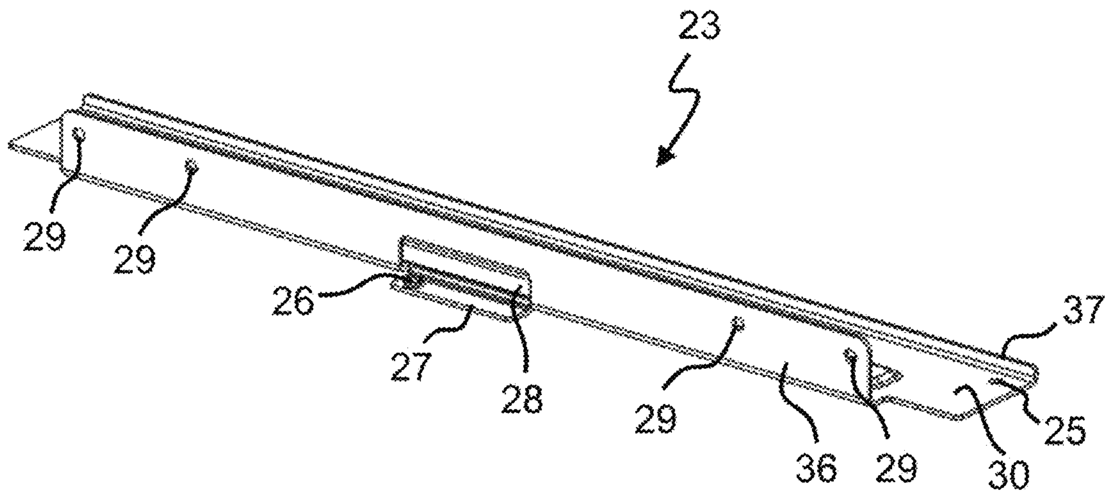
FIG. 11 is another isometric view of the lower connection bracket.
Figure 14:
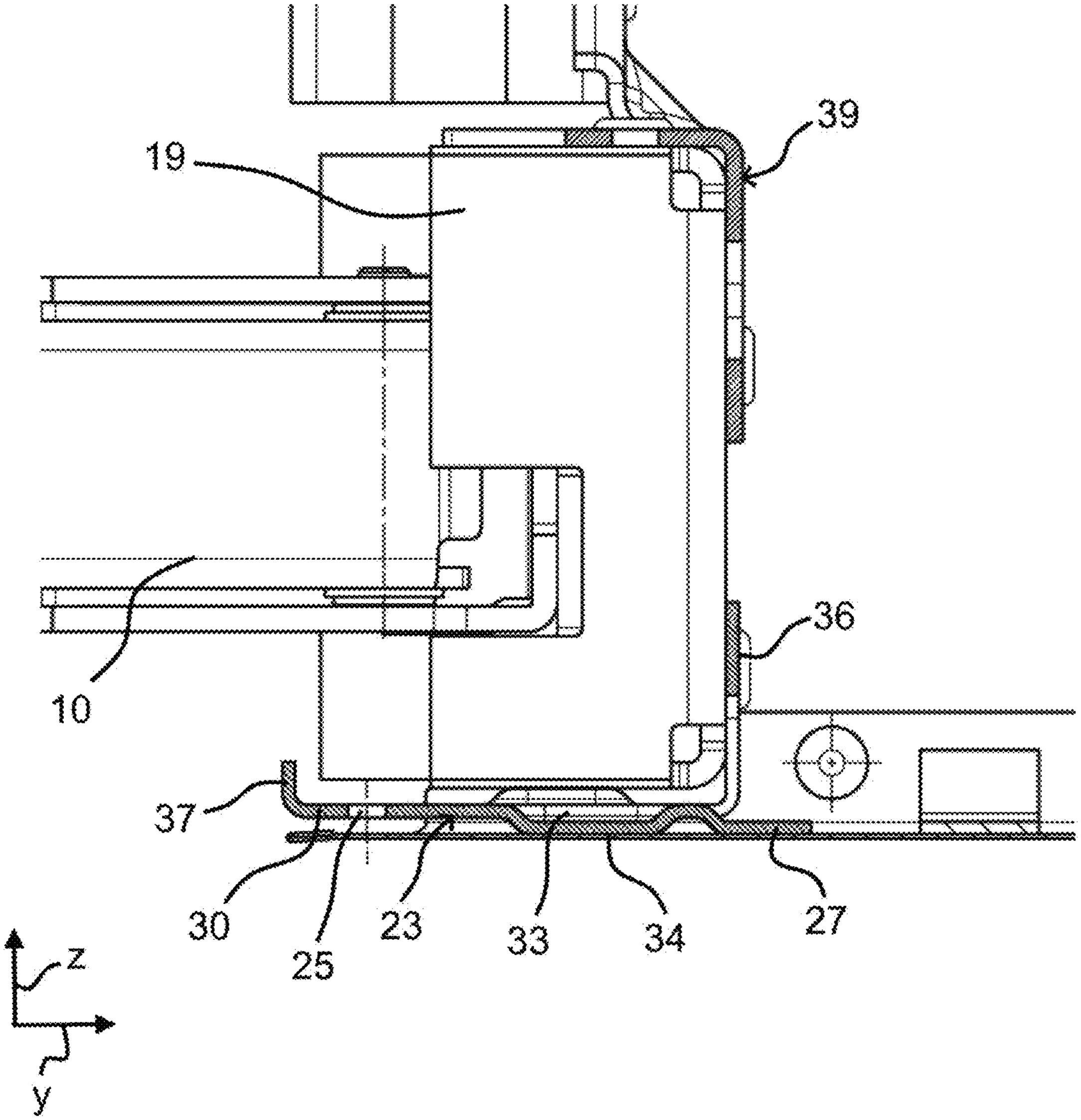
FIG. 14 is a cross-sectional view of the lower hinge and the hinge box embodiment where the lower hinge is connected, in a manner showing the base depression part of the lower connection bracket which seats to the lower panel.

With reference to FIG. 6, FIG. 10 and FIG. 11, the lower connection bracket 23 seats to the planar surface of the lower panel 13. With reference to FIG. 14, the lower connection bracket 23 contains a base depression 33 embodied to provide a second seating surface 34 in order to seat to the lower panel 13. The base depression 33 is provided at the base part 30 of the lower connection bracket 23. As shall be seen in FIG. 6, the base depression 33 has been preferably embodied in a middle region between the base embossments 31 of the lower connection bracket 23. With reference to FIG. 6, FIG. 10 and FIG. 11, the lower panel 13 has at least one lower panel connection flap 43. The lower panel connection flap 43 is essentially provided in a manner extending orthogonally to the planar surface of the lower panel 13. There can be more than one lower panel connection flap 43 around the periphery of the lower panel 13. The lower panel connection flap 43 is obtained by bending the planar surface of the lower panel 13. There is at least one lower panel connection hole 48 on the lower panel connection flap 43. A connection element not shown in the drawings, for instance a bolt or a screw is passed through the lower panel connection hole 48 and is retained to the body 2, and the connection of the lower panel 13 with the body 2 is provided. On the other hand, as shall be seen in FIG. 6, the lower connection bracket 23 comprises at least one first connection hole 25 such that a first connection element 35, for instance, a screw or bolt can pass in order to be connected to the lower panel 13. The first connection holes 25 can be provided at the mutual sides of the lower connection bracket 23 in the width direction x. Preferably, one of each of the first connection holes 25 are provided at the mutual sides of the lower connection bracket 23. There is a front wall 37 at the front side of the lower connection bracket 23. The front wall 37 extends essentially in an orthogonal direction to a planar base part 30 of the lower connection bracket 23. The planar base part 30 seats to the lower panel 13. There is a bracket rear wall 36, which essentially extends parallel to the front wall 37, at the opposite side to the side where the front wall 37 exists. The front wall 37 and the bracket rear wall 36 essentially extend in the height direction z. The front wall 37 can be shorter in the height direction z when compared with the bracket rear wall 36. In order for the lower connection bracket 23 to be connected to the lower hinge boxes 19, 20, there is at least one connection hole 29 provided on the bracket rear wall 36. Preferably, two connection holes 29 are provided for the connection of the lower connection bracket 23 to the first lower hinge box 19, and two connection holes 29 are provided for the connection of the lower connection bracket 23 to the second lower hinge box 20. As shall be seen in FIG. 9, a second connection element 42, for instance, a rivet passes through the connection holes 29 that exist on the bracket rear wall 36. The bracket rear wall 36 exists at a far side of a hinge box front opening 59 provided at the sides of the lower hinge boxes 19, 20 which face the hinge, on the lower connection bracket 23. In summary, the bracket rear wall 36 has connection holes 29 embodied to be connected to a hinge box rear wall 49 which is essentially in orthogonal direction with respect to the lower panel 13. Moreover, the lower connection bracket 23 comprises at least one connection flap 27 which has at least one second connection hole 26 through which the first connection element 35 passes, in order to be connected to the lower panel 13. The connection flap 27 is obtained by cutting the bracket rear wall 36 and afterwards by bending the bracket rear wall 36. Therefore, there is a cutout part 28 at the region where the connection flap 27 is provided at the bracket rear wall 36 FIG. 9. The connection flap 27 is provided in a middle part of the lower connection bracket 23. In other words, the connection flap 27 is provided at a middle region between the first connection holes 25 provided at the opposite sides of the lower connection bracket 23. As shall be seen in FIG. 7, the first connection element 35, for instance, a bolt or a screw passes through the second connection hole 26 provided on the connection flap 27. The lower connection bracket 23 is connected to the lower panel 13 both by means of the first connection elements 35 which pass through the second connection hole 26 which exists at the connection flap 27, and by means of the first connection elements 35 which pass through the first connection holes 25.

Figure 8:
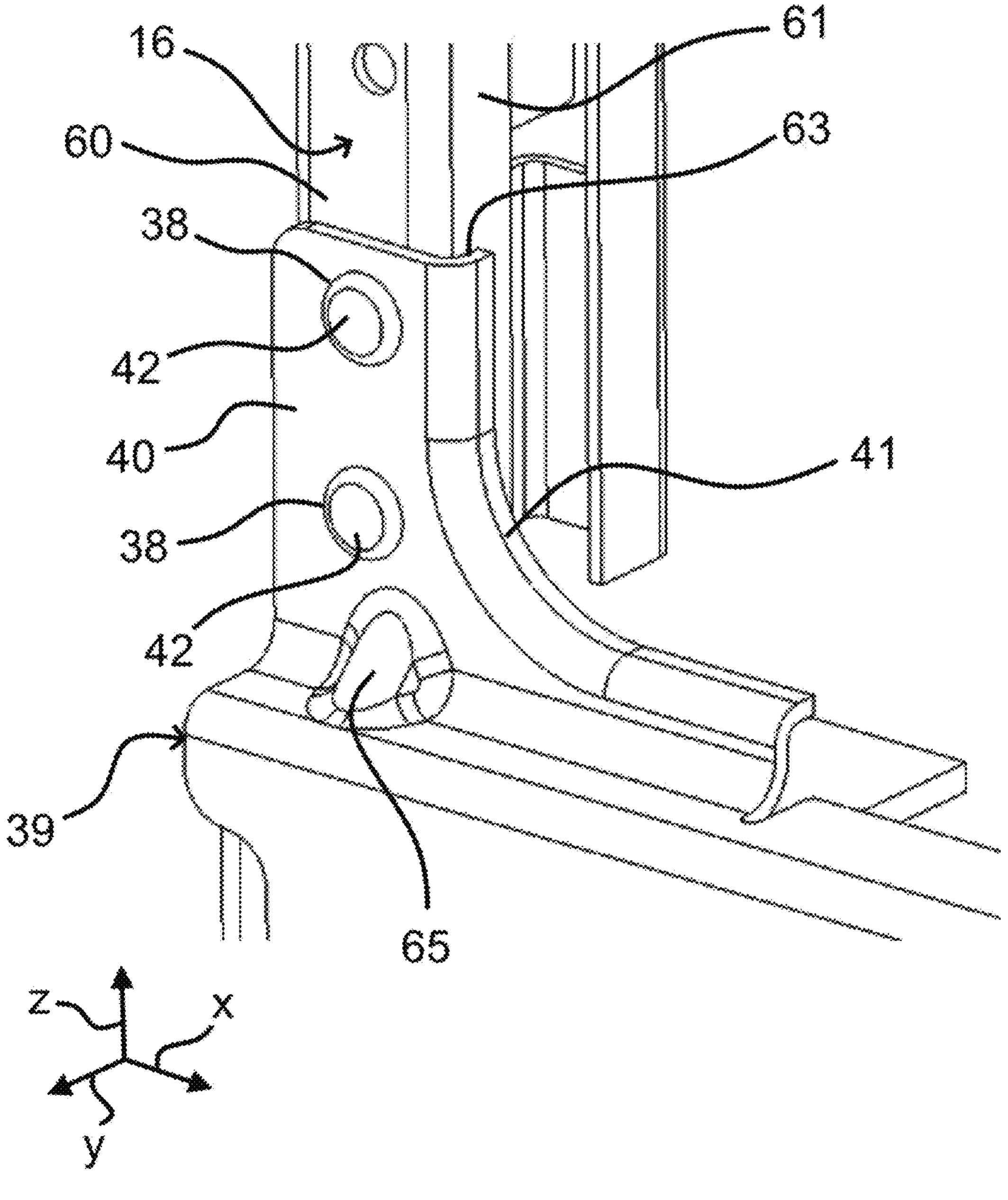
FIG. 8 is a zoomed isometric view of the part where the connection bracket part is connected to the second vertical profile element in the upper connection bracket.

With reference to FIG. 9, the upper connection bracket 39 is connected to an upper side of the lower hinge boxes 19, 20. The upper connection bracket 39 comprises a horizontal bracket wall 44 embodied to be connected to the hinge box upper wall 50 of each lower hinge box 19, 20, and a vertical bracket wall 45 embodied to be connected to the hinge box rear wall 49 of each lower hinge box 19, 20 and which extends essentially in an orthogonal direction to the horizontal bracket wall 44. As shall be seen in FIG. 12, there is at least one third connection hole 46 on the horizontal bracket wall 44. Preferably, third connection holes 46, which are two in number, are provided at one side of the horizontal bracket wall 44, and third connection holes 46, which are two in number, exist at the other side of the horizontal bracket wall 44. As shall be seen in FIG. 9, the second connection element 42 passes through these third connection holes 46, and the upper connection bracket 39 is connected to the hinge box upper wall 50 of each lower hinge box 19, 20. Again as shall be seen in FIG. 12, there is at least one fourth connection hole 47 on the vertical bracket wall 45. Preferably, fourth connection holes 47, which are three in number, exist at one side of the vertical bracket wall 45, and fourth connection holes 47, which are three in number, exist at the other side of the vertical bracket wall 45. As shall be seen in FIG. 9, the second connection element 42 passes through these fourth connection holes 47, and the upper connection bracket 39 is connected to the hinge box rear wall 49 of each lower hinge box 19, 20. The upper connection bracket 39 moreover comprises mutual connection bracket parts 40 embodied to be connected to the vertical profile elements 15, 16. The connection bracket parts 40 are provided with a distance in between in the width direction x. As shall be seen in FIG. 8 and FIG. 9, each of the connection bracket parts 40 is essentially an L-shaped connection extension. In more details, the connection bracket parts 40 extend in the width direction x and the height direction z. In other words, the connection bracket parts 40 are preferably a corner bracket. The connection bracket parts 40 are obtained by cutting a specific part of the horizontal bracket wall 44 and then by bending thereof. The connection bracket parts 40 comprise at least one bracket connection hole 38 through which a connection element passes, in order to be connected to a profile rear wall 60 of the vertical profile elements 15, 16 which faces the body 2. There is a bending part 41 at the connection bracket parts 40. The bending part 41 contains a resting wall 63 in a manner resting to a profile lateral wall 61 of the connection bracket parts 40, which is essentially in an orthogonal direction to the profile rear wall 60 of the vertical profile elements 15, 16. Thanks to this resting wall 63, the related vertical profile elements 15, 16 are aligned in accordance with the related connection bracket parts 40, during the connection process of the upper connection bracket 39 to the related vertical profile element 15, 16. In the connection bracket parts 40, moreover, a support structure 65 is also formed for reinforcing the connection bracket parts 40 against bending. The support structure 65 can preferably be a support rib. The support structure 65 is provided by extending in a manner supporting the related connection bracket part 40 between the horizontal bracket wall 44 and the related connection bracket part 40.

Figure 7:
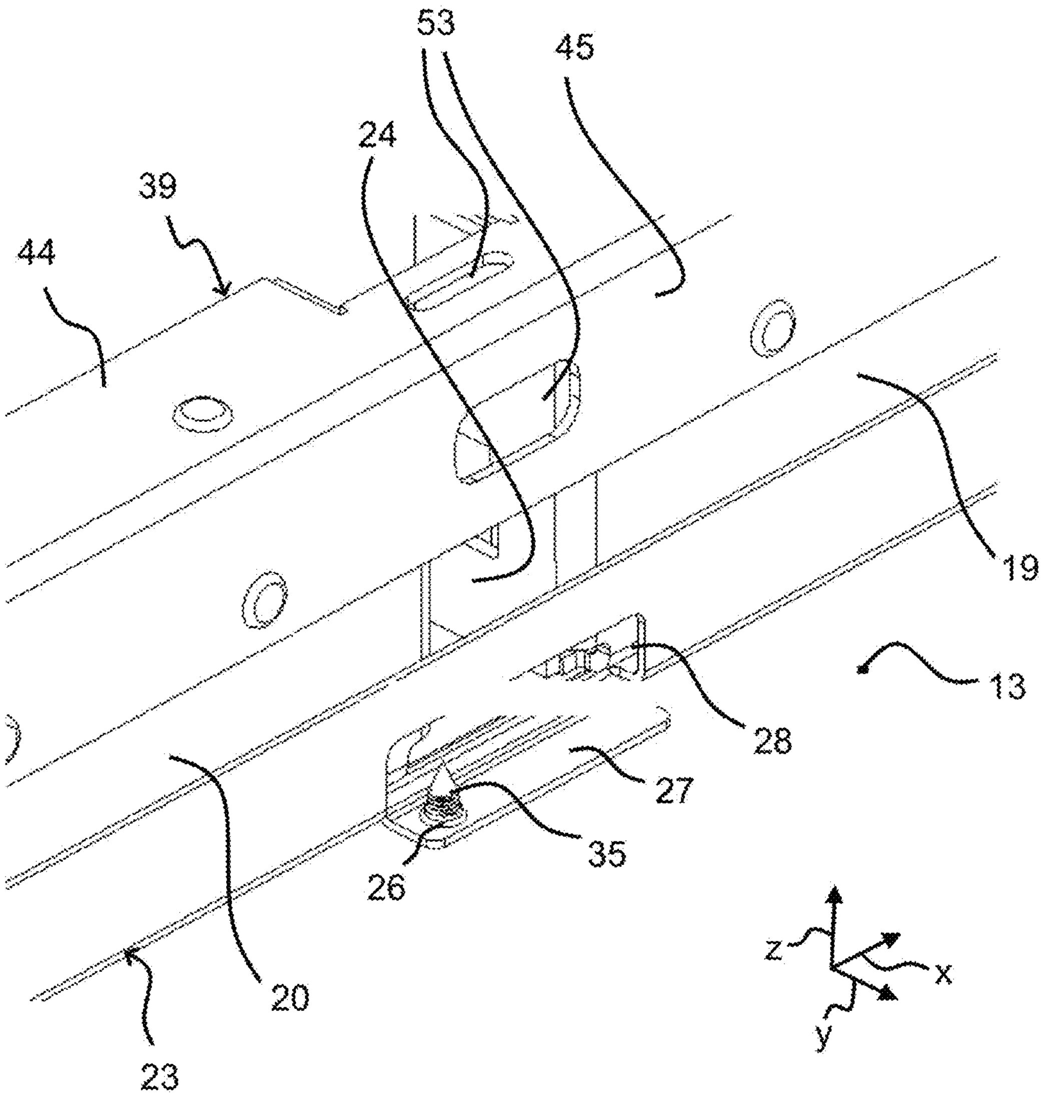
FIG. 7 is a zoomed isometric view of the hinge box embodiment which shows an upper connection bracket and a connection flap of the lower connection bracket.
Figure 12:
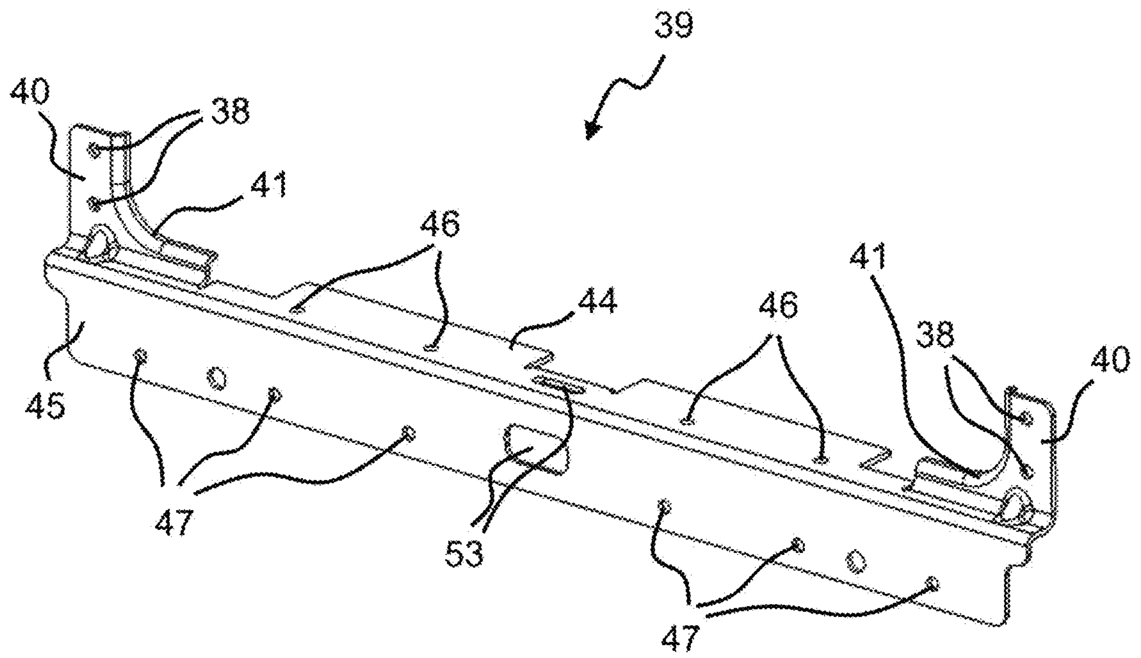
FIG. 12 is an isometric view of the upper connection bracket.

With reference to FIG. 7 and FIG. 12, the upper connection bracket 39 comprises at least one opening 53 provided in a manner opening to an intermediate space 24 which exists between the lower hinge boxes 19, 20. Preferably, two openings 53 have been provided on the upper connection bracket 39. One of the openings 53 has been provided on the horizontal bracket wall 44, and the other one has been provided on the vertical bracket wall 45. By means of this, as shall be seen in FIG. 5, the passage of an isolation material 64, provided in the body 2 of the cooling device 1, to the intermediate space 24 that exists between the lower hinge boxes 19, 20 is provided. The isolation material 64 can be any isolation material 64 in a manner providing isolation between the outer medium and the inner part of the cooling device 1.

By means of the invention, a reinforced hinge box embodiment 18 is provided, which is connected to the support frame 56 from one side and connected to the lower panel 13 of the body 2 and to the hinge boxes 19, 20 from the other side and thanks to this, which has increased resistance particularly against external forces which can occur during transportation of the cooling device 1.

The following is a summary list of reference numerals and the corresponding structure used in the above description of the invention:

1 cooling device
2 body
3 storage compartment
4 front opening
5 upper wall
6 lateral walls
7 lower wall
8 rear wall
9 door
10 lower hinge
11 upper hinge
12 machine compartment
13 lower panel
14 front frame
15 first vertical profile element
16 second vertical profile element
17 upper hinge box
18 hinge box embodiment
19 first lower hinge box
20 second lower hinge box
21 front caps
22 upper profile element
23 lower connection bracket
24 intermediate space
25 first connection hole
26 second connection hole
27 connection flap
28 cutout part
29 connection hole
30 base part
31 base embossment
32 first seating surface
33 base depression
34 second seating surface
35 first connection element
36 bracket rear wall
37 front wall
38 bracket connection hole
39 upper connection bracket
40 connection bracket part
41 bending part
42 second connection element
43 lower panel connection flap
44 horizontal bracket wall
45 vertical bracket wall
46 third connection hole
47 fourth connection hole
48 lower panel connection hole
49 hinge box rear wall
50 hinge box upper wall
51 hinge box lower wall
52 hinge box lateral walls
53 opening
54 first lower hinge recess

55 second lower hinge recess
56 support frame
57 first profile end part
58 second profile end part
59 hinge box front opening
60 profile rear wall
61 profile lateral wall
62 hinge connection opening
63 resting wall
64 isolation material
65 support structure
x width direction
y depth direction
Z height direction
ÜT device upper side
AT device lower side
ÖT device front side

The invention claimed is:

1. A cooling device, comprising:

a body having a lower wall, an upper wall, lateral walls and a rear wall;

hinges including an upper hinge and a lower hinge;

at least one door connected to said body by means of said hinges;

a lower panel; and a support frame provided at a front side of said body; wherein said at least one door is connected to said support frame by means of said hinges, wherein said support frame has mutual vertical profile elements, at least one upper hinge box provided at an upper side of said support frame where said upper hinge is connected, and a couple of lower hinge boxes provided at a lower side of said support frame for said lower hinge and wherein said lower hinge boxes each having a lower hinge recess formed therein for accommodating said lower hinge and said lower hinge recesses provided in a distanced manner to each other in a width direction, wherein said support frame has a lower connection bracket for sitting on said lower panel provided at a horizontal plane in an associated manner with said lower wall; wherein said lower hinge boxes are placed and connected to said lower connection bracket, and said support frame having at least one upper connection bracket connecting to said lower hinge boxes from a first side and connecting to each of said mutual vertical profile elements from a second side.

2. The cooling device according to claim 1, wherein each of said lower hinge boxes has a hinge box lower wall sitting on said lower connection bracket, and a hinge box upper wall provided at an opposite side with respect to said hinge box lower wall; wherein profile end parts of said mutual vertical profile elements are rested on said hinge box upper wall.

3. The cooling device according to claim 1, wherein said lower connection bracket has a first connection element and at least one first connection hole formed therein and wherein said first connection element passes through said at least one first connection hole and connects to said lower panel.

4. The cooling device according to claim 3, wherein said lower connection bracket has at least one connection flap which has at least one second connection hole formed therein and wherein at least one second connection element passes through said at least one second connection hole and connects to said lower panel.

5. The cooling device according to claim 1, wherein:

said lower hinge boxes having sides with a hinge box front opening formed therein and each having a hinge box rear wall; and said lower connection bracket has a bracket rear wall disposed at an opposite side of said hinge box front opening disposed at said sides of said lower hinge boxes facing said lower hinge; said bracket rear wall is connected to said hinge box rear wall which is generally in an orthogonal direction with respect to said lower panel.

6. The cooling device according to claim 5, wherein: said lower hinge boxes each have a hinge box upper wall; and said upper connection bracket has a horizontal bracket wall connected to said hinge box upper wall, a vertical bracket wall connected to said hinge box rear wall and said vertical bracket wall extends in an orthogonal direction to said horizontal bracket wall, and mutual connection bracket parts connected to said mutual vertical profile elements.

7. The cooling device according to claim 6, wherein each of said mutual connection bracket parts is an L-shaped connection extension.

8. The cooling device according to claim 6, wherein:

said mutual vertical profile elements each have a profile rear wall; and said mutual connection bracket parts each have at least one bracket connection hole formed therein and a connection element passes through said at least one bracket connection hole and is connected to said profile rear wall of said mutual vertical profile elements which faces said body.

9. The cooling device according to claim 8, wherein:

said mutual vertical profile elements each has a profile lateral wall; and said connection bracket parts each have a resting wall resting on said profile lateral wall which is in an orthogonal direction to said profile rear wall of said mutual vertical profile elements.

10. The cooling device according to claim 1, wherein said upper connection bracket has at least one opening formed therein and provided in a manner opening to an intermediate space which exists between said lower hinge boxes.

11. The cooling device according to claim 2, wherein said lower connection bracket has at least one base embossment which is in elevated form such that said hinge box lower wall of said lower hinge boxes is seated on said at least one base embossment and said at least one base embossment has a first seating surface for said lower hinge boxes.

12. The cooling device according to claim 1, wherein said lower connection bracket has a base depression formed therein to provide a seating surface in order to rest on said lower panel.

13. The cooling device according to claim 5, wherein each said hinge box rear wall has at least one hinge connection opening formed therein for connecting said lower hinge.

14. The cooling device according to claim 1, wherein said support frame contains an upper profile element which connects said mutual vertical profile elements to each other and generally extends horizontally; wherein said upper hinge box is connected to said upper profile element.

15. The cooling device according to claim 1, wherein said lower hinge boxes, said lower connection bracket and said upper connection bracket are made of a metal material.

16. The cooling device according to claim 15, wherein said metal material is a steel material.

17. The cooling device according to claim 1, wherein the cooling device is selected from the group consisting of a refrigerator and a freezer.

* * * * *